Figure 1:
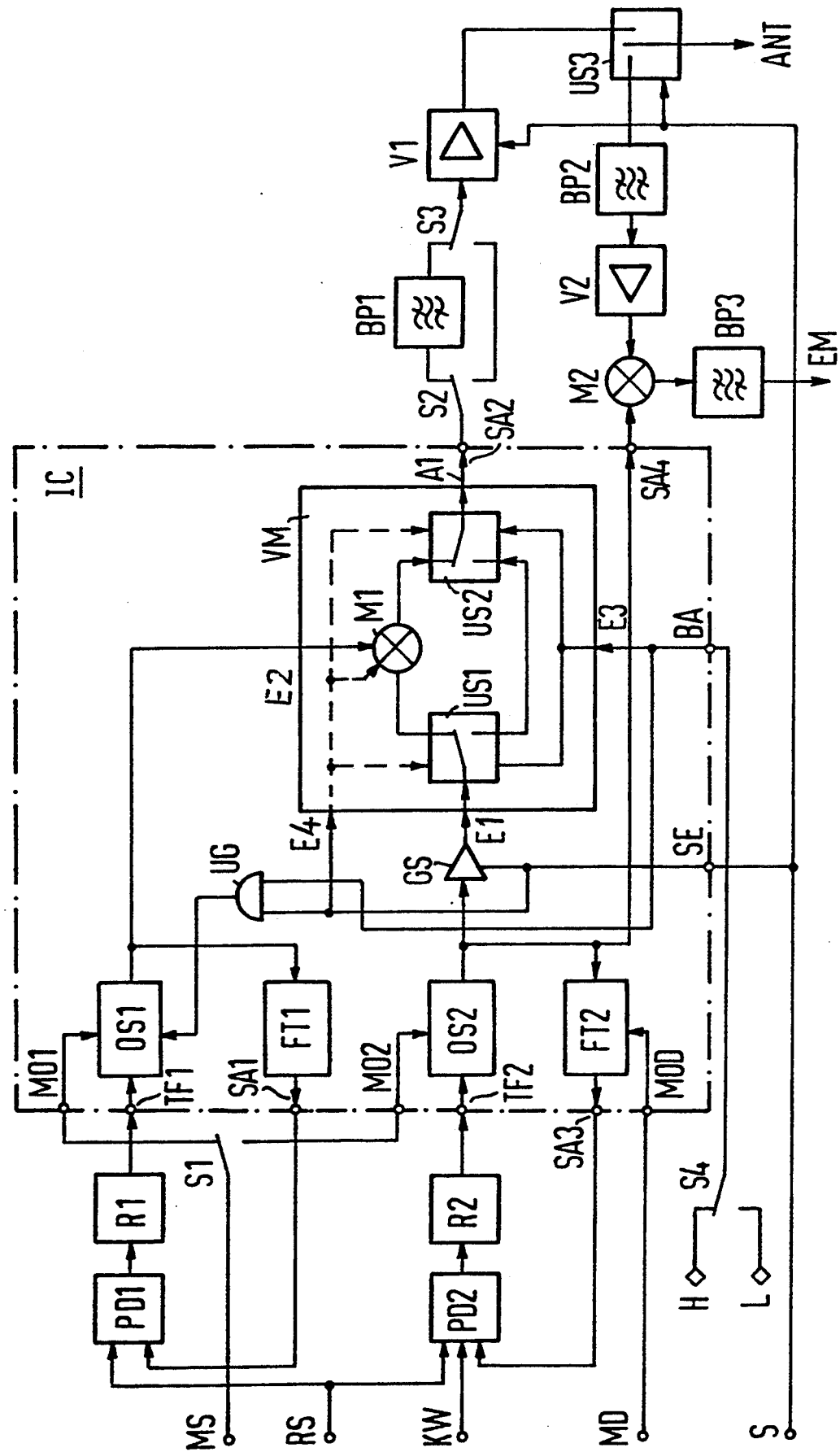

United States Patent [19]
Fenk et al.

[11] Patent Number: 5,337,005
[45] Date of Patent: Aug. 9, 1994

[54] INTEGRATED FREQUENCY SYNTHESIZER CIRCUIT FOR TRANSMIT-AND-RECEIVER OPERATION

[75] Inventors: Josef Fenk, Eching/Ottenburg; Volker Thomas, München, both of Fed. Rep. of Germany

[73] Assignee: Siemens Aktiengesellschaft, Munich, Fed. Rep. of Germany

[21] Appl. No.: 931,040

[22] Filed: Aug. 14, 1992

[30] Foreign Application Priority Data

Aug. 14, 1991 [DE] Fed. Rep. of Germany ....... 4126915

[51] Int. Cl.$^5$ .............................................. H03L 7/22
[52] U.S. Cl. ......................................... 328/14; 328/15; 328/155; 331/2; 332/127; 455/76; 455/118
[58] Field of Search ...................... 328/14, 15, 155; 307/262; 332/127; 331/2; 455/76, 75, 78, 103, 112, 113, 118, 119, 120

[56] References Cited

U.S. PATENT DOCUMENTS

| | | | |
|---|---|---|---|
| 3,982,109 | 9/1976 | Klinck et al. | 328/14 |
| 4,528,522 | 7/1985 | Matsuura | 331/2 |
| 5,270,669 | 12/1993 | Jokura | 328/14 |

FOREIGN PATENT DOCUMENTS

2100534 12/1982 United Kingdom .

OTHER PUBLICATIONS

Patent Abstracts of Japan, E-728 Mar. 16, 1989, vol. 13/No. 110 & JP-A 63-281520 (Tarusawa), Nov. 18, 1988.

Primary Examiner—Andrew M. Dolinar
Attorney, Agent, or Firm—Herbert L. Lerner; Laurence A. Greenberg

[57] ABSTRACT

An integrated circuit includes first and second oscillators. A controllable switch has a signal input connected to a signal output of the second oscillator. A modulator has two signal inputs each being coupled to a signal output of a respective one of the first oscillator and the controllable switch. At least one controllable reversing switch has two signal inputs each being connected to a signal output of a respective one of the modulator and the controllable switch. A controllable frequency divider has a signal input connected to a signal output of the second oscillator. Two signal input terminals are each connected to a modulation input of a respective one of the oscillators, and two input terminals are each connected to the frequency control input of a respective one of the oscillators. Signal output terminals are each connected to the signal output of a respective one of the first oscillator, the at least one controllable reversing switch, the frequency divider, and the second oscillator. Control terminals are respectively connected to the control input of the frequency divider, to the control input of the controllable switch and the switch input of the first oscillator, and to the control input of the at least one controllable reversing switch.

5 Claims, 2 Drawing Sheets

INTEGRATED FREQUENCY SYNTHESIZER CIRCUIT FOR TRANSMIT-AND-RECEIVER OPERATION

The invention relates to an integrated frequency synthesizer circuit for transmit-and-receive operation.

Modern mobile radio transmitter and receiver systems predominantly use frequency synthesizer circuits to generate the mixed signals required for the various frequency conversions. The demands made of such circuits are quite variable, sometimes even contradictory, depending on the particular application. In any case, however, their size in three dimensions should be kept as small as possible. That is achieved above all by integrating as many circuit elements as possible into an integrated circuit. On the other hand, for the sake of great economy, the circuit should be very versatile in use and have little redundancy. Moreover, applications in stationary systems require high accuracy, and power consumption plays a lesser role in such a case, while in applications in mobile systems, low power consumption is sought, at the cost of lower accuracy.

It is accordingly an object of the invention to provide an integrated frequency synthesizer circuit for transmit-and-receive operation, which overcomes the hereinafore-mentioned disadvantages of the heretofore-known devices of this general type and which meets the above-mentioned demands.

With the foregoing and other objects in view there is provided, in accordance with the invention, an integrated circuit, comprising a first oscillator having a frequency control input, a modulation input, a switch input, and a signal output; a second oscillator having a frequency control input, a modulation input, and a signal output; a controllable switch having a signal input connected to the signal output of the second oscillator, and having a signal output and a control input; a modulator having two signal inputs each being coupled to the signal output of a respective one of the first oscillator and the controllable switch, and having a signal output; at least one controllable reversing switch having two signal inputs each being connected to the signal output of a respective one of the modulator and the controllable switch, and having a signal output and a control input; a controllable frequency divider having a signal input connected to the signal output of the second oscillator, and having a signal output and a control input; two signal input terminals each being connected to the modulation input of a respective one of the oscillators, and two input terminals each being connected to the frequency control input of a respective one of the oscillators; signal output terminals each being connected to the signal output of a respective one of the first oscillator, the at least one controllable reversing switch, the frequency divider, and the second oscillator; and control terminals respectively connected to the control input of the frequency divider, to the control input of the controllable switch and the switch input of the first oscillator, and to the control input of the at least one controllable reversing switch.

In accordance with another feature of the invention, the controllable switch, the at least one controllable reversing switch and the modulator have switch inputs, and including an AND gate having an output connected to the switch input of the first oscillator, one input connected to the switch inputs of the controllable switch, the at least one controllable reversing switch and the modulator, and another input connected to the control input of the at least one controllable reversing switch.

In accordance with a further feature of the invention, the at least one controllable reversing switch includes first and second controllable reversing switches having interconnected control inputs, the first controllable reversing switch having the signal input coupled to the signal output of the controllable switch, the second controllable reversing switch having the signal input connected to the signal output of the modulator, the second controllable reversing switch having another signal input, and the first controllable reversing switch having two other signal outputs each being connected to a respective one of the other signal input of the second controllable reversing switch and one of the signal inputs of the modulator.

In accordance with an added feature of the invention, the modulator and the controllable reversing switches all have switch inputs connected to the switch input of the first oscillator.

In accordance with a concomitant feature of the invention, the modulator and the controllable reversing switches are part of a circuit block, the circuit block having two transistors with bases, collectors and coupled emitters, a controllable current source connected to the coupled emitters of the transistors; resistors each being connected to the collector of a respective one of the transistors, a common controllable switch element connected between the resistors and a supply potential, and further controllable reversing switches each being connected to the base of a respective one of the transistors for supplying a supply or a reference potential or an input signal.

Other features which are considered as characteristic for the invention are set forth in the appended claims.

Although the invention is illustrated and described herein as embodied in an integrated frequency synthesizer circuit for transmit-and-receive operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
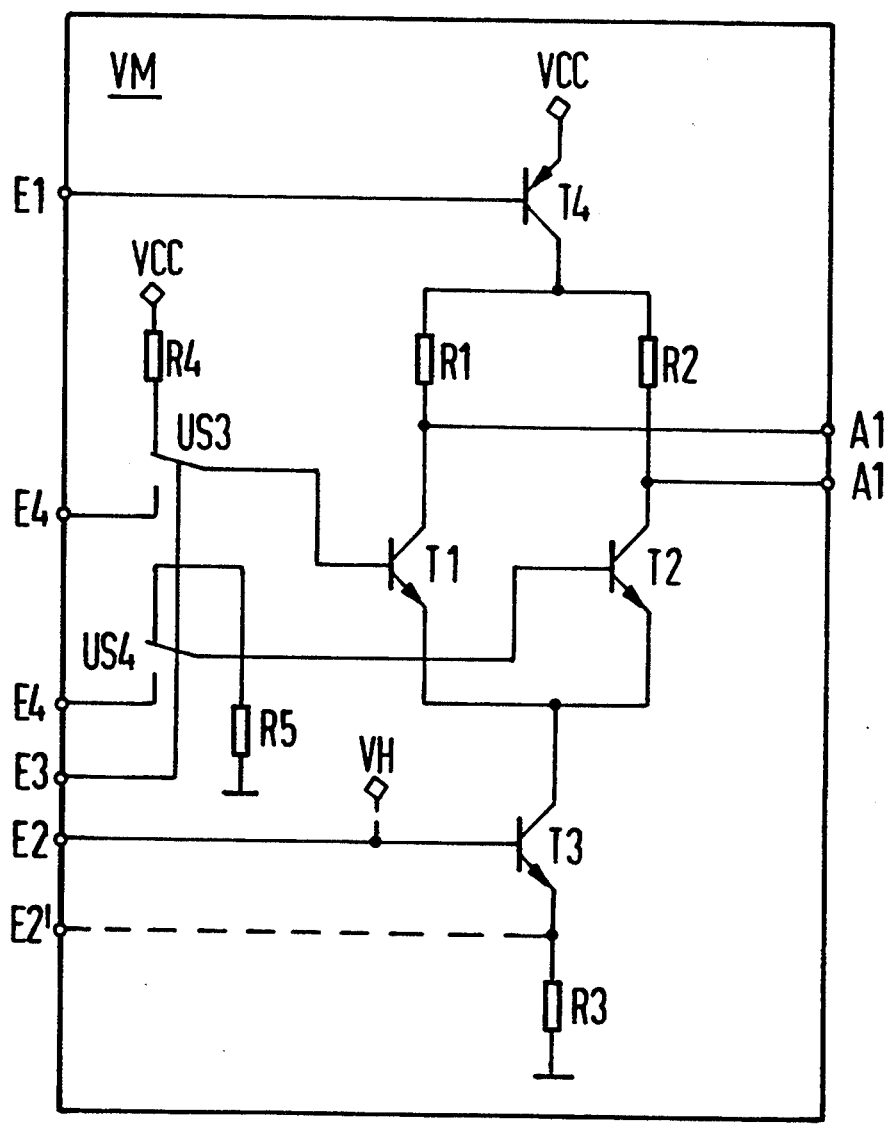

FIG. 1 is a schematic and block circuit diagram of a generalized exemplary embodiment of a circuit according to the invention in an application circuit; and FIG. 2 is a schematic circuit diagram of a preferred embodiment of an amplifier mixer stage in a circuit according to the invention.

Referring now to the figures of the drawing in detail and first, particularly, to FIG. 1 thereof, there is seen an integrated circuit IC according to the invention, which includes two oscillators OS1 and OS2, having signal outputs at which respective output signals are present and are each variable in frequency by means of corresponding signals, at a respective frequency control input and a modulation input. Moreover, the oscillator OS1 may be turned off by means of a signal that is present at an additional switch input. A controllable switch GS which is also provided, has a signal input that is connected to the signal output of the oscillator OS2. A controllable switch of this kind may be constructed as a driver stage that can be turned off.

The output of the controllable switch GS is carried to a signal input of a controllable reversing switch US1, having one signal output which is applied to one signal input of a modulator M1 and another signal output which is connected to one signal input of a controllable reversing switch US2. Another signal input of the modulator M1 is coupled to the signal output of the oscillator OS1, while the signal output of the modulator M1 is carried to the other signal input of the controllable reversing switch US2. Control inputs of the controllable reversing switches US1 and US2 are united and connected to a control terminal BA. A control terminal SE which is also provided, is connected to control inputs of the controllable switch GS, of the oscillator OS1, of the modulator M1 and of the controllable reversing switches US1 and US2. A control terminal MOD is connected to the control input of a frequency divider FT2, which has a signal input that is connected to the signal output of the oscillator OS2. The divider ratio of the frequency divider FT2 can be varied or reversed through the use of a signal MD applied to the control terminal MOD. In addition to the control terminals SE, MOD and BA, the integrated circuit IC has signal input terminals MO1, MO2 and signal input terminals TF1, TF2, which are each connected by respective modulation inputs to the frequency control inputs of the two oscillators OS1 and OS2. Instead of the signal input terminals MO1, MO2, TF1, TF2 in the illustrated embodiment, the oscillators OS1 and OS2 may also be provided with an adaptation outside the integrated circuit IC, for instance by means of an oscillating circuit with a capacitor diode that is triggered with the various appropriate signals.

Additionally, signal output terminals SA1–SA4 are provided. The signal output terminals SA2–SA4 are respectively connected to the signal outputs of the controllable reversing switch US2, the frequency divider FT2 and the oscillator OS2. According to a feature of the invention, the signal output SA1 is connected through a frequency divider FT1 to the output of the oscillator OS1. Moreover, the integrated circuit IC may include other non-illustrated circuit elements which in turn may have appropriate terminals.

The illustrated exemplary embodiment also shows the connection of an integrated circuit IC according to the invention in a transmitter or receiver configuration that can be used either in a stationary system or in a mobile system. The signal input terminals MO1 and MO2 are each connected to one respective signal output of a reversing switch S1, having a signal input that is acted upon by a modulation signal MS. The signal input terminals TF1 and TF2 are each connected to the signal output of a respective regulator R1 and R2, which in turn are each connected to the output side of a respective phase detector PD1 and PD2. A reference signal RS is applied to interconnected reference signal inputs of the two phase detectors PD1 and PD2. A signal input of the phase detector PD1 is connected to the signal output terminal SA1, and a signal input of the phase detector PD2 is connected to the signal output terminal SA3, of the integrated circuit IC. A control signal KW is applied to a control input of the phase detector PD2 and with the aid thereof an internal divider ratio of the phase detector PD2 can be established, for instance for channel selection or for switching over the controllable oscillator OS2 in the receive mode.

A signal input of a reversing switch S2 is connected to the signal output terminal SA2 of the integrated circuit IC. One signal output of the reversing switch S2 is connected directly to one signal input of a reversing switch S3, while the other signal output of the reversing switch S2 is carried to the other signal input of the reversing switch S3 with the interposition of a bandpass filter BP1. The reversing switch S3 is followed by an amplifier V1, having an output that is applied to one signal output of a controlled reversing switch US3. Another signal output of the controlled reversing switch US3 is connected to an input of a bandpass filter BP2, while an antenna ANT, for example, is connected to a signal input/output. The output side of the bandpass filter BP2 is followed by an amplifier V2, having an output that is carried to one input of a modulator M2, having another signal input that is connected to the signal output terminal SA4 of the integrated circuit IC. The output of the modulator M2 is coupled through a bandpass filter BP3 to a receiver device EM which is not shown in detail, but which may be a limiter and demodulator unit.

The control terminal SE of the integrated circuit IC is connected to a switch input of the amplifier V1 and to a control input of the controlled reversing switch US3 and is acted upon by a transmission mode control signal S. The control terminal BA of the integrated circuit IC is connected to a signal output of a reversing switch S4. Signals corresponding to low and high levels are applied at signal inputs L and H of the reversing switch S4.

Two different options are provided. In option 1, as shown, the modulation signal MS is switched by means of the reversing switch S1 to the signal input terminal MO1 of the integrated circuit IC, the signal output terminal SA2 is switched to the bandpass filter BP1 by means of the reversing switch S2 and correspondingly the output of the bandpass filter BP1 is switched to the amplifier V1 by means of the reversing switch S3. Within the integrated circuit IC, the output of the controlled switch GS is switched through to the modulator M1 by means of the controlled reversing switch US1, and the output of that modulator is switched through to the signal output terminal SA2 by means of the controlled reversing switch US2. For instance, through the use of the reversing switch S4, a high level H is applied to the control terminal BA. In option 2, the positions of the reversing switches S1, S2, S3 and S4 and of the controlled reversing switches US1 and US2 are correspondingly opposite.

Finally, according to a further feature of the invention, the control or switch input of the oscillator OS1 is preceded by an AND gate UG. An input of the AND gate UG is connected to the control or switch inputs of the controlled switch GS, the controlled reversing switches US1, US2 and the modulator M1, and thus to the control terminal SE. The other input of the AND gate UG is coupled to the control inputs of the two controlled reversing switches US1 and US2, which in turn are connected to the control terminal BA.

In the transmission mode, in principle in the integrated circuit IC, the controlled switch GS is closed and the oscillator OS1, the controlled reversing switches US1, US2 and the modulator M1 are switched on, or in other words activated. In contrast, in the receive mode, these circuit elements are turned off. In option 1, the frequency of the signal to be transmitted is composed of the frequency of the two oscillators OS1 and OS2, while in option 2, only the oscillator OS2 furnishes the signal to be sent, while the oscillator OS1 is turned off. In this case, the possibility also exists of turning off the oscillator OS1, for example by linking together the control terminals SE and BA by means of an AND gate and applying its output to the switch input of the oscillator OS1. In the receive mode, in both options, only the signal of the oscillator OS2 is used for forming the intermediate frequency. In option 1, however, no switchover of the oscillator OS2 between the transmit and receive mode as in option 2 is necessary. Option 1 is intended for cases in which greater accuracy is required, as in the case of stationary operation, for instance, while in option 2 lower-power operation is attained while economizing on one bandpass filter (the bandpass filter BP1), as is appropriate, for instance, for mobile use. Besides the embodiment shown in the exemplary embodiment, with the reversing switches S1–S4, it is naturally possible to instead provide hard-wired connections, depending on the application.

The controlled reversing switches US1 and US2 and the modulator M1 of FIG. 1 are combined into a circuit block VM, which has inputs E1–E4 and one output A1. The inputs E1 and E2 respectively correspond to the signal inputs of the controllable reversing switch US1 and the modulator M1, while the input E3 corresponds to the coupled control inputs of the two controllable reversing switches US1 and US2, and the input E4 corresponds to the coupled control or turn-off inputs of the controlled reversing switches US1 and US2 and of the modulator M1. The output A1 can be considered equivalent to the signal output of the controlled reversing switch US2. A preferred embodiment of a circuit block VM as a combined amplifier/mixer is shown in FIG. 2.

The circuit block VM of FIG. 2 includes two npn transistors T1 and T2, having coupled-together emitters that are connected to a reference potential through the collector-to-emitter path of an npn transistor T3 and a resistor R3 connected in series therewith. The base of the transistor T3 is provided as the input E2. Alternatively, however, the emitter of the transistor T3 may be used as an input E2'. The base of the transistor T3 is then at an auxiliary potential VH. The collectors of the transistors T1 and T2, which form the differential output A1, are coupled to one another through respective resistors R1 and R2 and are connected to a supply potential VCC through the collector-to-emitter path of a pnp transistor T4. The base of the transistor T4 is intended as the input El, or in other words as a turn-off input. The bases of the transistors T1 and T2 can be applied alternatively, by means of the two controlled reversing switches US3 and US4, to the differential input E4 or through resistors R4 and R5 to the supply potential or reference potential. Control of the reversing switches US3 and US4 is performed by means of suitable signals at the input E3.

Circuit variations are possible in the embodiment shown. For instance, the input E4 or the output A1 may be constructed asymmetrically instead of symmetrically; the signal feed for the transistor T3 may take place at the emitter instead of at the base; and the inputs E2 and E4 may be transposed. It is also optionally possible to omit the resistors R1 and R2 and the transistor T4 and to provide so-called open-collector outputs, if the power supply is to be effected through external inductances, for instance, and if turning on and off is done, for instance, through external elements or the internal current source having the transistor T3 and the resistor R3.

We claim:

1. An integrated circuit, comprising:
    a first oscillator having a frequency control input, a modulation input, a switch input, and a signal output;
    a second oscillator having a frequency control input, a modulation input, and a signal output;
    a controllable switch having a signal input connected to the signal output of said second oscillator, and having a signal output and a control input;
    a modulator having two signal inputs each being coupled to the signal output of a respective one of said first oscillator and said controllable switch, and having a signal output;
    at least one controllable reversing switch having two signal inputs each being connected to the signal output of a respective one of said modulator and said controllable switch, and having a signal output and a control input;
    a controllable frequency divider having a signal input connected to the signal output of said second oscillator, and having a signal output and a control input;
    two signal input terminals each being connected to the modulation input of a respective one of said oscillators, and two input terminals each being connected to the frequency control input of a respective one of said oscillators;
    signal output terminals each being connected to the signal output of a respective one of said first oscillator, said at least one controllable reversing switch, said frequency divider, and said second oscillator; and
    control terminals respectively connected to the control input of said frequency divider, to the control input of said controllable switch and the switch input of said first oscillator, and to the control input of said at least one controllable reversing switch.

2. The circuit configuration according to claim 1, wherein said controllable switch, said at least one controllable reversing switch and said modulator have switch inputs, and including an AND gate having an output connected to the switch input of said first oscillator, one input connected to the switch inputs of said controllable switch, said at least one controllable reversing switch and said modulator, and another input connected to the control input of said at least one controllable reversing switch.

3. The integrated circuit according to claim 1, wherein said at least one controllable reversing switch includes first and second controllable reversing switches having interconnected control inputs,
    said first controllable reversing switch having the signal input coupled to the signal output of said controllable switch,
    said second controllable reversing switch having the signal input connected to the signal output of said modulator,
    said second controllable reversing switch having another signal input, and
    said first controllable reversing switch having two other signal outputs each being connected to a respective one of the other signal input of said second controllable reversing switch and one of the signal inputs of said modulator.

4. The integrated circuit according to claim 3, wherein said modulator and said controllable reversing switches all have switch inputs connected to the switch input of said first oscillator.

5. The integrated circuit according to claim 3, wherein:
said modulator and said controllable reversing switches are part of a circuit block,
said circuit block having two transistors with bases, collectors and coupled emitters,
a controllable current source connected to said coupled emitters of said transistors;
resistors each being connected to the collector of a respective one of said transistors,
a common controllable switch element connected between said resistors and a supply potential, and
further controllable reversing switches each being connected to the base of a respective one of said transistors for supplying a supply or a reference potential or an input signal.

* * * * *